(12) United States Patent
Soucy

(10) Patent No.: US 6,438,862 B1
(45) Date of Patent: Aug. 27, 2002

(54) DRYING APPARATUS FOR COFFEE BEANS AND SIMILAR CROPS

(76) Inventor: Paul B Soucy, 119 West St., Methuen, MA (US) 01844

(*) Notice: Subject to any disclaimer, the term of this patent is extended or adjusted under 35 U.S.C. 154(b) by 0 days.

(21) Appl. No.: 09/592,333

(22) Filed: Jun. 13, 2000

Related U.S. Application Data

(63) Continuation-in-part of application No. 09/021,360, filed on Feb. 10, 1998, now Pat. No. 6,202,321.
(60) Provisional application No. 60/043,364, filed on Apr. 2, 1997.

(51) Int. Cl.[7] ............................................... F26B 17/12
(52) U.S. Cl. ........................... 34/168; 34/577; 34/573; 34/586; 34/67; 34/68; 34/135; 426/465; 426/466; 426/467; 99/483; 99/281; 99/233
(58) Field of Search ........................ 34/573, 577, 586, 34/589, 67, 68, 135, 136, 218, 225, 233, 168; 426/465, 466, 467, 523; 99/421 H, 483, 286, 233, 360, 476

(56) References Cited

U.S. PATENT DOCUMENTS

| | | |
|---|---|---|
| 278,199 A | 5/1883 | Sweeny |
| 1,556,865 A | 10/1925 | Muller |
| 4,045,880 A | 9/1977 | Steffen |
| 4,099,338 A | 7/1978 | Mullin |
| 4,122,828 A | 10/1978 | DiPeri |
| 4,263,721 A | 4/1981 | Danford |
| 4,391,046 A | 7/1983 | Pietraschke |
| 4,490,926 A | 1/1985 | Stokes |
| 4,501,074 A | 2/1985 | O'Hare |
| 5,001,846 A | 3/1991 | Andrassy |
| 5,038,498 A * | 8/1991 | Woolsey ....................... 34/225 |
| 5,065,528 A * | 11/1991 | Kaneko et al. ................. 34/93 |
| 5,584,127 A | 12/1996 | Sutherland |
| 5,893,218 A * | 4/1999 | Hunter et al. .................. 34/492 |
| 5,915,815 A * | 6/1999 | Moore et al. .................. 34/305 |
| 5,960,560 A | 10/1999 | Stoll |
| 5,960,561 A * | 10/1999 | Parodi et al. .................. 34/550 |
| 6,032,384 A * | 3/2000 | Fingerson et al. ............. 34/427 |
| 6,223,454 B1 * | 5/2001 | Fingerson et al. ............. 34/427 |
| 6,230,419 B1 * | 5/2001 | Hinter et al. .................. 34/381 |

* cited by examiner

Primary Examiner—William C. Doerrler
Assistant Examiner—Mark Shulman
(74) Attorney, Agent, or Firm—Vernon C. Maine; Scott J. Asmus; Maine & Asmus

(57) ABSTRACT

The invention is a distributed airways airflow dryer system for coffee beans and other such bulk crops. The interior volume or container of the dryer or dehydrator system that holds the bulk crops, is filled with an airways network structure that provides uniformly distributed open wall airflow passageways in the bulk crops. The airflow passages communicate with airflow openings in the walls or bottom of the container, to divide and admit the drying airflow into and through the full volume of the bulk crops as a large number of individual airstreams. Corrugated, ribbed, or cross-ribbed airflow plates are preferred embodiments that provide narrow open grooves or channels that expose the beans or kernels of the bulk crop directly to the airflow. This results in faster drying and greater uniformity of the drying effect on the full volume of the bulk crops. The airflow can be readily reversed through the system to further distribute the accelerated drying effects of the distributed airflow on the volume of bulk crops.

20 Claims, 16 Drawing Sheets

DRYING APPARATUS FOR COFFEE BEANS AND SIMILAR CROPS

This application relates to and claims priority to U.S. application Ser. No. 60/043,364, filed Apr. 2, 1997, and is a continuation-in-part of application Ser. No. 09/021,360, filed Feb. 10, 1998, now U.S. Pat. No. 6,202,321 by the same inventor.

BACKGROUND OF THE INVENTION

1. Technical Field of the Invention

This invention most generally relates to methods and apparatus for drying coffee beans and other green crops or coarse granular bulk materials composed of beans, seeds, pods, or grains of relatively large and uniform size, to reduce the moisture content. More particularly, it relates to bulk product containers for use in low pressure airflow drying systems, including convective air and solar powered systems.

2. Background

The art of harvesting and processing coffee beans from tree-borne cherries to the green coffee bean of commerce consists of two principle methods, the "dry" method and the "wet" method. Either method must result in moisture content equivalent to one third or more of the bean's weight being removed, to produce a commercial product.

The dry method is the more ancient and rudimentary. The cherries are hand-picked all in one picking, washed, and sun-dried on drying ground or concrete slabs in thin layers, usually for a period of two to three weeks. The beans are heated by solar radiation from above and by secondary radiation from the already warmed concrete slab below, while natural circulation of relatively dry air over the top of the beans slowly leaches out the moisture. The beans ferment during the process, and are turned several times a day to promote even drying. They are covered at night to protect them from reabsorbing moisture during the night time dewpoint and temperature changes.

In the wet method, only the ripe cherries are picked in any one picking of a tree. It may take three to five sequential pickings in a season over the time it takes between the earliest and the latest cherries to ripen. After the cherries are washed, the outside fruit pulp is removed by machines and the berries are then placed into large concrete tanks to ferment for twelve to twenty-four hours, then poured into concrete sluiceways or washing machines to be thoroughly washed in constantly running water. Then they are dried in much the same way as in the dry method, except that the drying time is shorter. These beans are then processed through hulling machines to remove the remaining layers of skin.

Problems with either method of this art include the inefficient, labor-intensive and lengthy sun-drying time of beans arranged on open air slabs. There have been introduced over the years, other manual, passive solar methods and devices attempting to promote and control air movement in combination with heat, to remove the moisture from bulk crops. Most typically, the beans or other materials being dried, are supported on a foramenous surface or in a container having at least foramenous bottom surface or screen, to permit a greater degree of circulation or air flow in contact with the underside as well as the topside of the bulk materials.

Various electrical powered and/or fuel-fired dryer systems have also been used to try to accelerate the drying time and prevent mold problems. There are many patents that describe related technologies and devices. Most of these alternatives add expense and complexity to an otherwise simple process. Failing to safeguard the beans from excess moisture, in particular the formation of mold during the drying process is crucial as the value of the crop drops dramatically if mold occurs. Over drying can also occur using accelerated methods; this also affects the quality and value of the crop. A sampling of the art of convective and low pressure air drying systems is included to provide context for the reader:

Stokes' U.S. Pat. No. 4,490,926 (1985) discloses a solar drying device and method for lumber, tobacco and grain. It includes a solar collector, a drying chamber, and a dehumidification system. The background section mentions solar heated kilns and dryers with easy access and containerized methods, wheeled vehicles or carts, for moving materials into and out of the dryer. Insulation and double glazing of light-admitting sheet materials is discussed, as is passing air between a drying chamber and a dehumidifying chamber. The focus is on drying and reusing the air.

Sutherland's U.S. Pat. No. 5,584,127 (1996) is a recent patent for a solar powered fruit dryer. The focus of the apparatus design is on re-circulation of a portion of the drying gas. It refers to air circulating through perforated shelves (col. 4, line 32) upon which the materials are arranged. Column 4, line 60, describes the physical embodiment in some detail, including air flow volumes.

Andrassy's U.S. Pat. No. 5,001,846 (1991) is a solar drying apparatus with a translucent sloping top and means for evacuating the condensation from the moist air. The specification describes a perforated or porous tray on which the materials are arranged for drying. A solar powered fan forces drying air vertically through the porous tray.

Mullin's U.S. Pat. No. 4,099,338 (1978) shows an elaborate, solar-assisted dryer for tobacco, onions, titanium dioxide drying, polyester fiber setting, and roasting nuts and cereals. The focus appears to be on ratios of solar heated makeup air in the circulation system to save fuel. The material is dried on a forarnenous conveyor belt.

O'Hare's U.S. Pat. No. 4,501,074 (1985) is a convection powered solar food dryer that discloses a solar collector on the inlet side for heating intake air, and a vertical solar tower or column to accelerate the convection of warm air through the system by suction. The actual drying chamber can be remoted from the solar devices at each end of the convection system. The materials are arranged on shelves in the drying chamber.

Steffen's U.S. Pat. No. 4,045,880 (1977) is a solar grain drying apparatus. It discloses a fan forced down draft eve inlet solar roof heating system, that then drives the drying air up through the perforated floor of the central drying chamber. The air is then exhausted upwards roof exhaust fans in the drying chamber ceiling.

Muller's U.S. Pat. No. 1,556,865 (1923) is a solar powered dryer system for vegetable matter, consisting of a series of circumfrential racks with inlet perforations in the sidewalls and internal shelf brackets in the corners for holding drying shelves or trays. The racks are configured for interlocked stacking underneath a solar collector roof which has a central exhaust vent.

Pietraschke's U.S. Pat. No. 4,391,046 (1983) is a solar heated grain drying system featuring an inlet manifold receiving multiple collector pipes and a fan blowing the intake air up through a perforated floor in the drying chamber.

Sweeny's U.S. Pat. No. 278,199 (1883) is a coffee roaster showing perforated drums for containing the coffee beans, configured to revolve within a heated chamber. The drums are feed by hoppers through the ends. The drums use internal vanes to distribute the beans or other materials lengthwise, particularly for loading and unloading the drums. Heating is by other than solar means.

Danford's U.S. Pat. No. 4,263,721 (1981) is a tobacco curing and drying structure that is configured for adding makeup air, using a heat exchanger and means for partial re-circulation.

It is useful, in conclusion, to review key aspects of the drying process. In the passive solar drying of bulk crops such as coffee and grain, airflow is generally more limited than heat, due to the relatively low differential pressure that can be generated in low cost, solar radiation dryers. It takes many hours or days to affect a significant reduction in moisture levels in the passive solar drying of crops. The relative amount of airflow to which the crops are directly exposed has been demonstrated in passive solar dryers to be the more significant factor to the dryer's utility and efficiency, compared to simply adding more heat. Too much heat at this stage will do more damage than good.

A more deceptive aspect of the drying process is evident in commercial operations. Where a large quantity of the bulk crop is arranged as a deep layer on a screened floor of a container or drying room, and large volumes of air are forced up through the layer of loose material by fans, there is a distinct and inevitable lack of uniformity of the drying throughout the volume of the batch. Unequal rates of drying means that some percentage of the material is either over-dried, or still not dry, when the drying operation is concluded. Other modes of drying loose batches of bulk crops are all affected by this problem to some degree. This significantly affects quality.

It should be readily apparent from the above material that there are numerous and interrelated shortcomings in the art of basic dryers for bulk crops such as coffee; particularly as to the need for affordable advances in the state of the art for faster and more efficient drying without the need for substantially more complex or expensive equipment.

SUMMARY OF THE INVENTION

It is therefore an object of the invention to configure a container or dryer to obtain a more effective application of airflow, preferably a relatively dry, warm airflow, to the batch of bulk crops being subjected to the drying operation, while retaining a low cost structure and a simple bulk container handling system.

The invention in it's simplest form is a low pressure airflow dryer or dehydrator system for granular bulk crops such as whole coffee beans, coca beans, and various grains where a substantial degree of moisture must be removed from the green beans, seeds, pods or grains, as part of the processing of the bulk product, in order to prepare it for further processing or use. The system, or key components, may be fabricated of stainless steel or plastic or such other materials as the user may find suitable for practical or regulatory reasons.

At the core of the system, there is a specialized bulk crop container specially configured to form a system of open wall airways uniformly distributed throughout the selected bulk material when it is added to the container, the airways connecting through openings in the top and bottom or sides of the container to airflow sources so that a distributed airflow can be directed through the airway network of the container to leach excess moisture efficiently from the bulk material.

The key to creating an open-wall airway network distributed throughout the container is the use of an internal structural network of minimal volume that provides an array of open face grooves or channels for airflow. The width of the face or top edge of each groove or channel is specified to be sufficiently narrow to prevent more than partial penetration of the groove by an average size coffee bean, particle of grain or kernel of the material being dried. The depth of the groove or channel is sufficient to assure an airflow passageway will remain open the full length of the groove or channel, when the container is full of the bulk material.

As explained, each groove or channel has an "open" or exposed side presented to the bulk material, but is sufficiently narrow to restrain the beans or kernels from filling the groove. This array of airflow channels provides a significant amount of the bulk material with direct or near direct exposure to the drying effects of the airflow in the groove or channel. Closely adjacent channels and uniformly spaced internal structural elements assures a relatively quick penetration of the drying effects of the airflow through the full volume of the bulk material in the container.

An efficient form of the required internal structure is a series of parallel partitions or airflow plates, dividing the container into very thin bays or compartments. The opposing faces of each partition present a parallel set of grooves to their respective bays or compartments, the grooves running the full height or width of the partition, and terminating at or actually projecting through a foramenous end wall or bottom panel such that the airway formed by the channel is accessible to an airflow that is ducted or channeled to that wall or bottom panel.

Practical embodiments of partition material for airflow plates, as will be discussed more fully below, include both ribbed panels, where both sides of a flat sheet are configured with parallel sets of raised ribs, the spaces in between which are channels; and corrugated panels, where both sides of the panel present to their respective bays, a parallel array of ridges and channels. The material may be extruded with the requisite ribs and channels, or formed from sheet stock. Other forms and embodiments of the internal structure are within the scope of the invention, and many have been disclosed by this applicant in priority documents.

The cycle of loading and unloading of the bulk product into and out of the dryer system may be enhanced by configuring the container or containers with bottom panel gates which can be opened to dump the contents, and closed for refill and operation of the dryer, without removing the container from the system. The container is scaleable and adaptable to dryer systems utilizing heat exchangers, solar radiation or other power sources for generating a warm, relatively dry, low to moderate pressure airflow. The container, inserted or connected to the airflow plenum of the system for both inlet and exhaust, absorbs the full flow of drying air through its interior.

By arrangement of the partitions, the airflow in the containers can be vertical, which is particularly useful for very low airflow pressure systems such as passive solar systems, where thermally generated convective airflow with minimal head pressure can be applied to a single level container. Alternatively, a user may, by using forced airflow systems able to provide a much greater pressure and volume of air than typical passive solar systems, with or without a supplemental heat source for adding more heat to the air, select or configure a dryer differently. The user may obtain either faster drying time of a small batch of materials by pushing more air through the dryer, up to a maximum useful rate of extraction of moisture; or greater batch capacity by using larger and more complex containers with either vertical or horizontal airflow networks, interconnected with ductwork to link the containers.

The top of the container must be fully open or openable so that bulk materials can be readily poured into all compartments of the container. Provisions for supporting the partitions or airflow plates within the container can be varied, and may depend on the orientation of the plates as whether vertical or horizontal, but the top edges of the partitions should be of somewhat uniform height and not be unduly restrictive to the loading or pouring in and leveling of the bulk materials. Gates or doors on the bottom of the container must resist the force and hold the weight of the bulk materials when loaded, and be readily openable so as to allow the dried bulk material to be emptied from each compartment or bay through the bottom of the container and collected for repackaging or further processing according to the user's particular setup.

The rib and channel structure of the airflow plates provides an inherent resistance to bending of the plate lengthwise of the grooves and substantially less resistance to bending as between adjacent channels. Horizontally oriented airflow plates are generally able to be end supported by slots on the side of the container, while vertically oriented airflow plates may need intermediate supports. One form of intermediate support may be a sheet of material such as stainless steel, that is V-folded and then slotted at regular intervals from the fold to nearly the opposing edges. The V brackets are then inverted, oriented to span the container from side to side, spaced apart uniformly from each other and the ends of the container and secured to the sides, effectively dividing the container into bays. The airflow plates are then inserted into the slots so as to span the container at right angles to the V brackets, subdividing the bays into compartments.

The principle functional components of a dryer system of the invention, an airflow source, a bulk materials container configured to provide the uniformly distributed open wall airways network of the invention, a means for receiving and supporting the removable container within the dryer system in such a way as to constrain the air flow to flowing through the airways of the container, and means by which the container can be filled and emptied.

Still other objects and advantages of the invention will become readily apparent to those skilled in this art from the following detailed description, wherein I have shown and described only preferred embodiments of the invention, simply by way of illustration of the best mode contemplated by me on carrying out my invention.

DESCRIPTION OF THE PREFERRED EMBODIMENT

Figure 1:
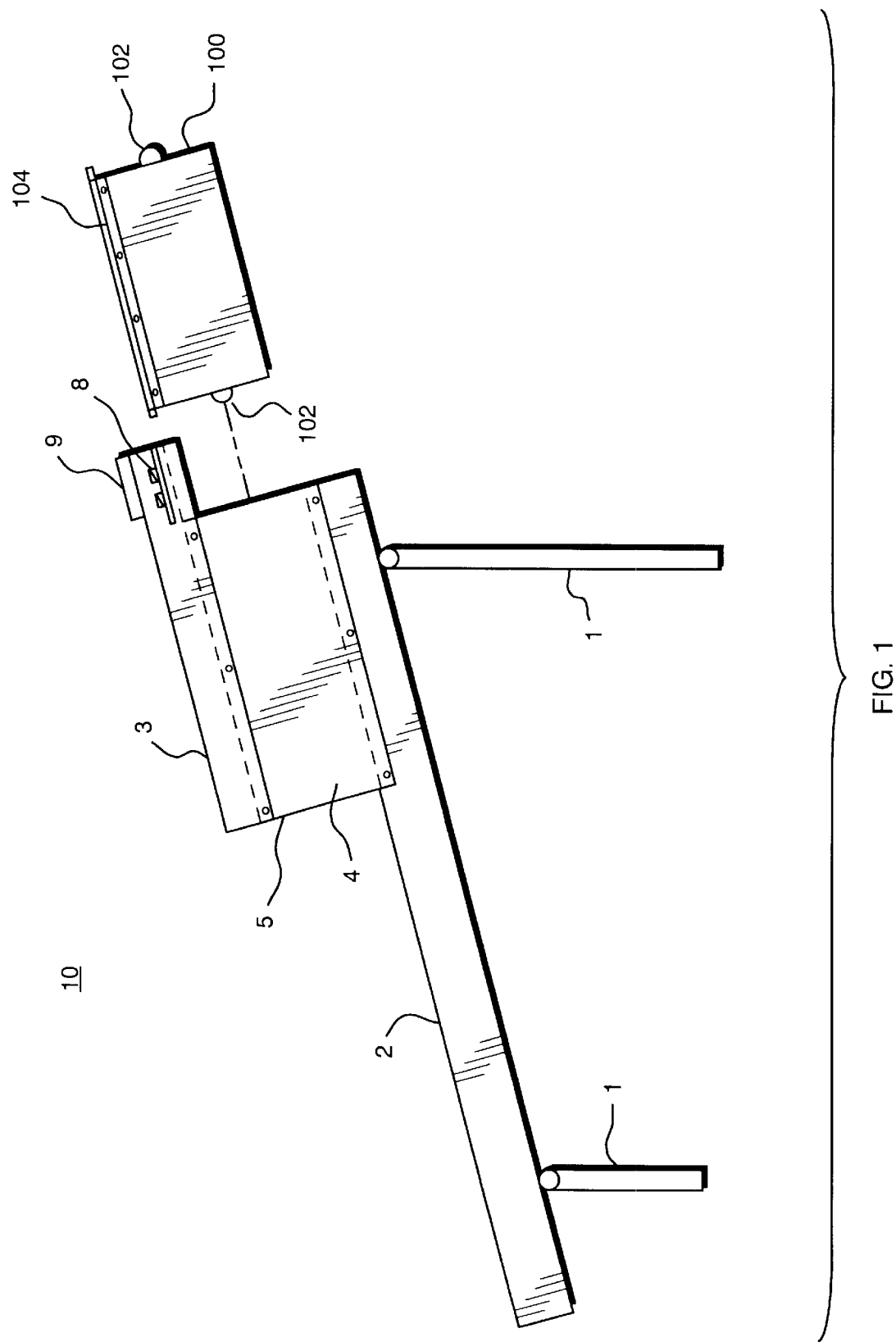
FIG. 1 is a side view of a preferred embodiment solar dryer of the invention, showing the rack, solar powered convective generator, container housing, container and transparent top assembly.
Figure 2:
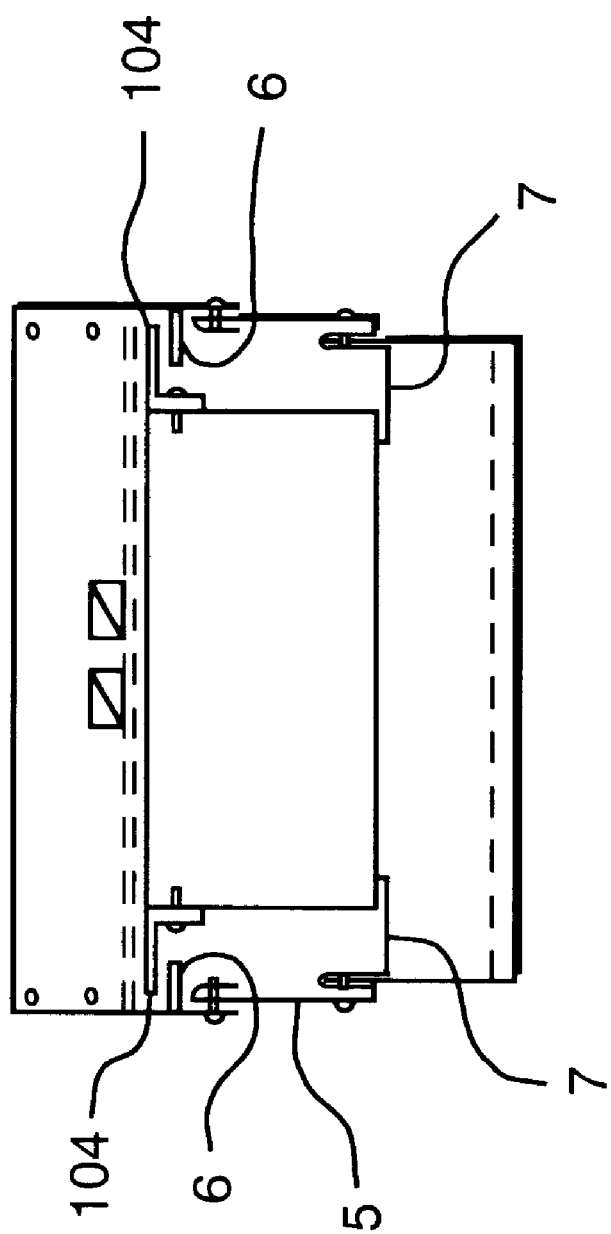
FIG. 2 is an open end view of the dryer of FIG. 1, showing the container of FIG. 1 in place.

Referring to FIGS. 1–2, there is illustrated a solar powered dryer system 10 with a removable, vertical air flow, bulk materials container 100. Rack assembly 1 is made of pipe material secured to the ground or a base of some sort, and passive solar convective airflow generator 2 is attached to it. Top assembly solar collector 3, consisting of a frame with a translucent top surface, is attached to sidewalls 4, forming plenum 5. The top assembly is equipped with a circulation fan 8 powered by solar cell 9, which boosts the convective air flow through the dryer system. Container 100 is manually insertable through an opening in the upper end of plenum 5, by the use of handles 102. FIG. 2 shows the end view cross section of container 100 installed in plenum 5.

Container 100 is configured with an interior airway network structure of uniformly distributed, vertical, open wall, airflow passageways which open through the bottom panel to admit the convective airflow generated by airflow generator 2. The open wall airways are too small to be filled by the grains or kernels of the bulk crops placed in the container for drying. The container can be filled to the top of the airway structure, the bulk material enjoying a distributed flow of air from bottom to top, as will be further explained in the later figures.

The interior sidewalls of plenum 5 are configured with sidebars 6 and with side skirts 7. Container 100 is supported by its external sidewall sliders 104, bearing on plenum sidebars 6. The bottom surface of container 100 contacts side skirts 7. This contact serves to divide the plenum into upper and lower chambers, and to constrain the vertical air flow to flowing from the lower chamber through the internal airways in the container into the upper chamber.

Referring now to FIGS. 3–12, container 100 has an interior network of vertical airflow plates 110, uniformly spaced and parallel to each other, extending across the width of the container. The airflow plates are held in position by slotted top support brackets 112, oriented at right angles to the airflow plates, and slotted bottom panels 114.

Figure 3:
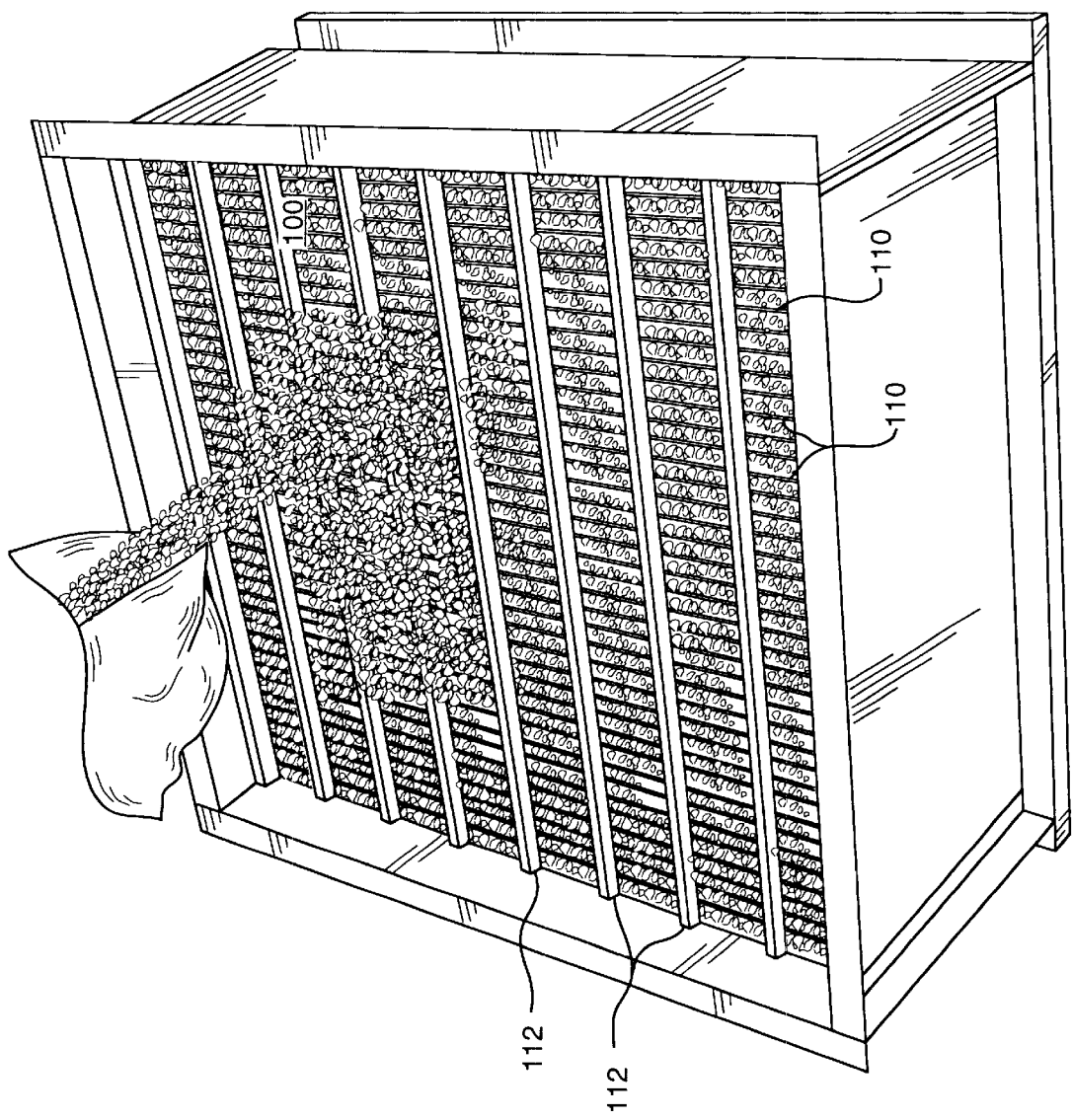
FIG. 3 is a perspective view of the container of FIGS. 1 and 2, showing the filling of the compartments of the container with a bulk crop.

The bulk material is added as shown in FIG. 3, to container 100, to a nominally full state, about level with the tops of airflow plates 110. There is a ventilated bottom panel, not shown, permitting airflow through the bottom panel and to the airplates.

Figure 4:
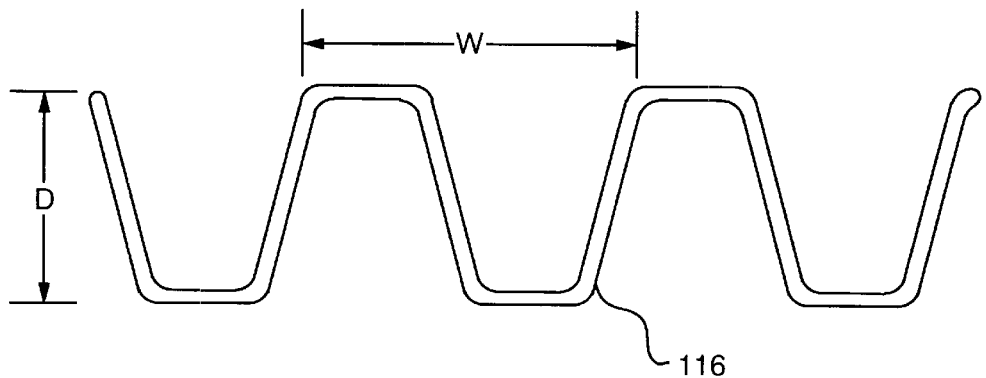
FIG. 4 is a partial edge view of a corrugated airflow plate.
Figure 5:
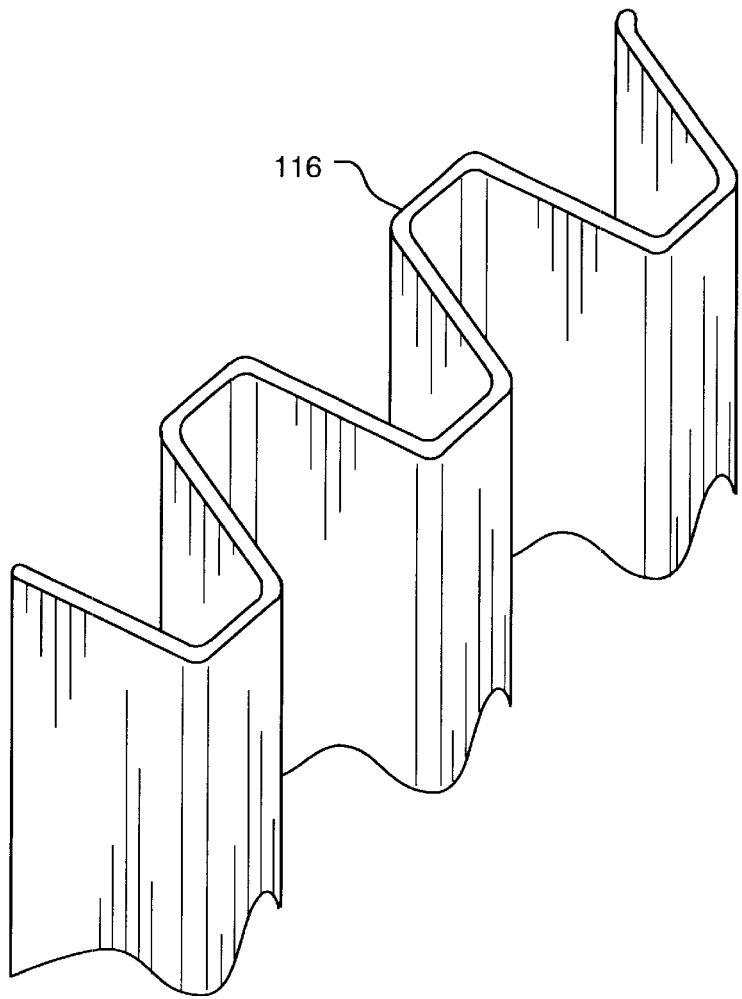
FIG. 5 is a partial perspective view of the corrugated airflow plate of FIG. 4.
Figure 6:
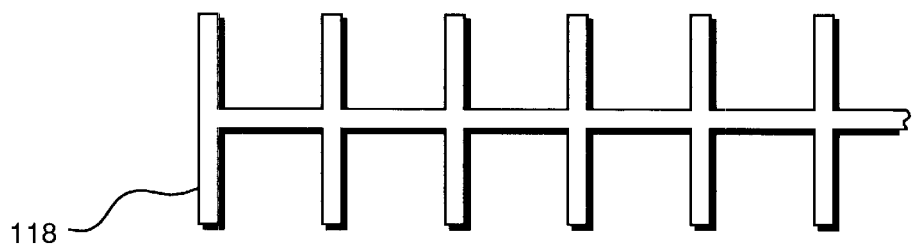
FIG. 6 is a partial edge view of a ribbed airflow plate.

Airflow plates 110 are variously fabricated as shown in FIGS. 4 and 5, of stainless steel sheets of 0.010 to 0.015 inches thick, into corrugated airflow plates 116. The width and depth of the channels provided by the corrugations is determined by the size of the grains or kernels of the bulk crop being dried. When the container is intended for the drying of coffee beans, the depth D of the corrugations is about one eighth ($\frac{1}{8}$) inch. The width W of the corrugations is about one sixth ($\frac{1}{6}$) inch.

Figure 7:
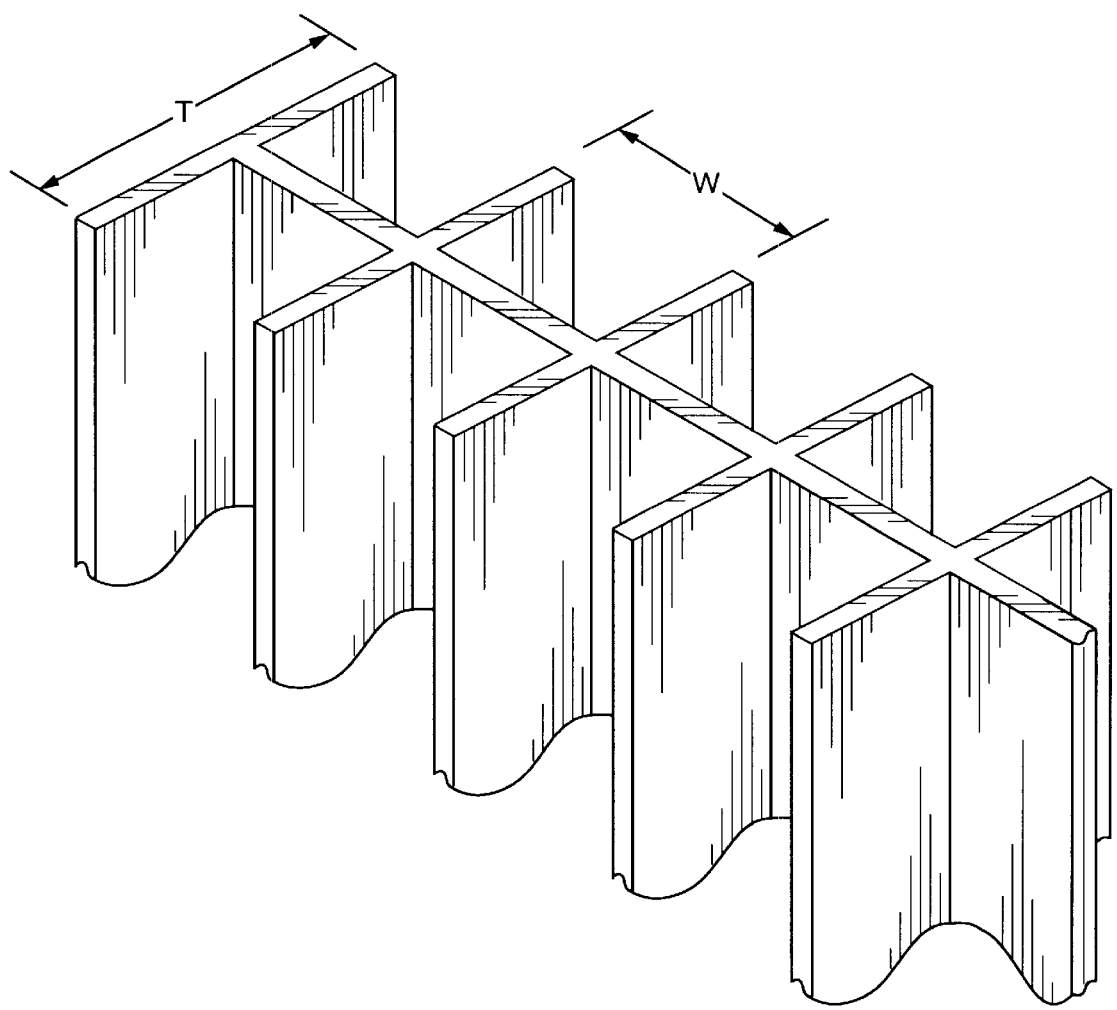
FIG. 7 is a partial perspective view of the ribbed airflow plate of FIG. 6.
Figure 8:
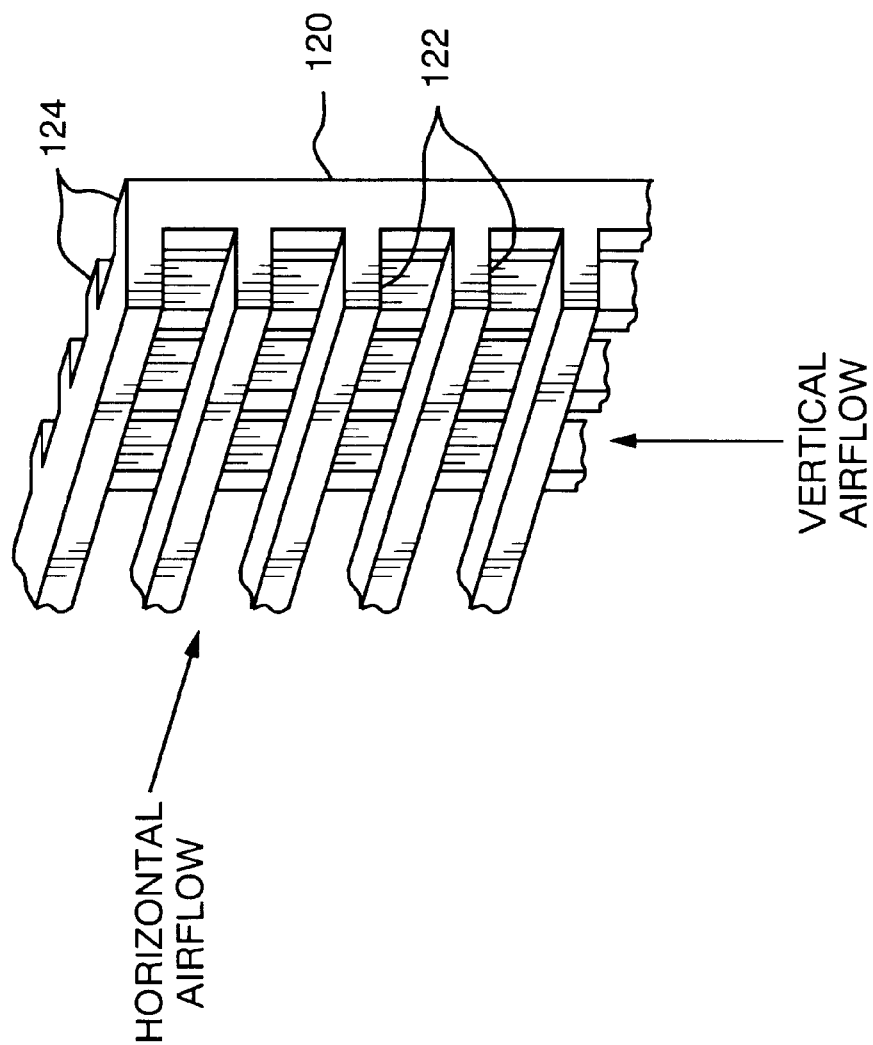
FIG. 8 is a partial perspective view of a cross ribbed airflow plate.
Figure 9:
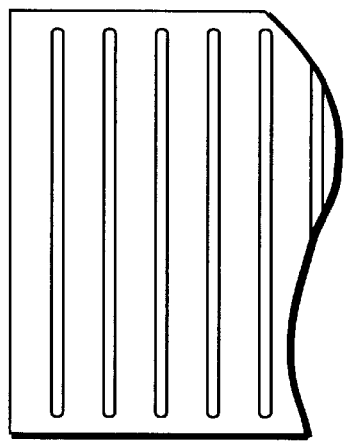
FIG. 9 is a partial plan view of a slotted bottom panel as used in the container of FIG. 3.
Figure 10:
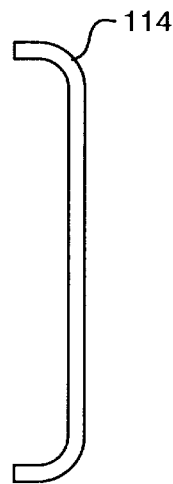
FIG. 10 is an edge view of the panel of FIG. 9, after the edges are folded to right angles.
Figure 11:
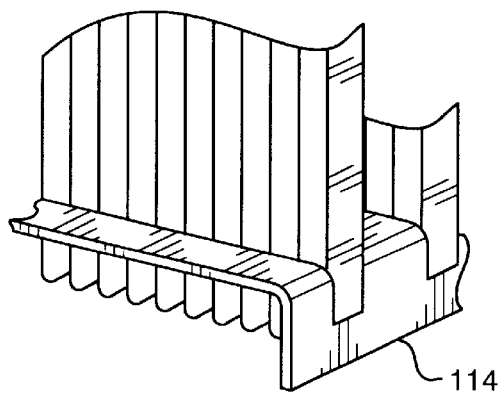
FIG. 11 is a partial perspective view of the panel of FIG. 10, with airflow plates mounted in the slots of the panel.

Airflow plates may alternately be fabricated as shown in FIGS. 7 and 8, as double faced, ribbed extrusions, or ribbed airflow plates 118, where the ribs on each face of the plate provide airway passages the same as the channels of the corrugated airflow plates 116. The preferred embodiment of ribbed airflow plate 118, for use with coffee beans, provides a channel of similar size to that of corrugated airflow plate 116. The thickness T of airflow plate 118, which is of course twice the depth of the channel formed by two ribs less the thickness of the center section, is one half ($\frac{1}{2}$) inch. The width W of the channel is about one fifth ($\frac{1}{5}$) of an inch, reflecting the relatively thicker rib of the extrusion, as compared to the thinner stainless steel material of airplate 116.

Referring to FIG. 8, an alternative airflow plate design provides for horizontal and vertical airflow passages on respective sides of the airflow plate, constructed as open gridwork so that the bulk materials on either side of the plate benefit from the drying effects of the airflow, irrespective of which direction it flows. Crossflow plate 120 consists of a first set of parallel ribs 122, to which a second set of parallel ribs 124, is mated at right angles. The preferred embodiment for drying coffee beans is configured with channels of substantially the same size as airflow plates 116 and 118.

Figure 12:
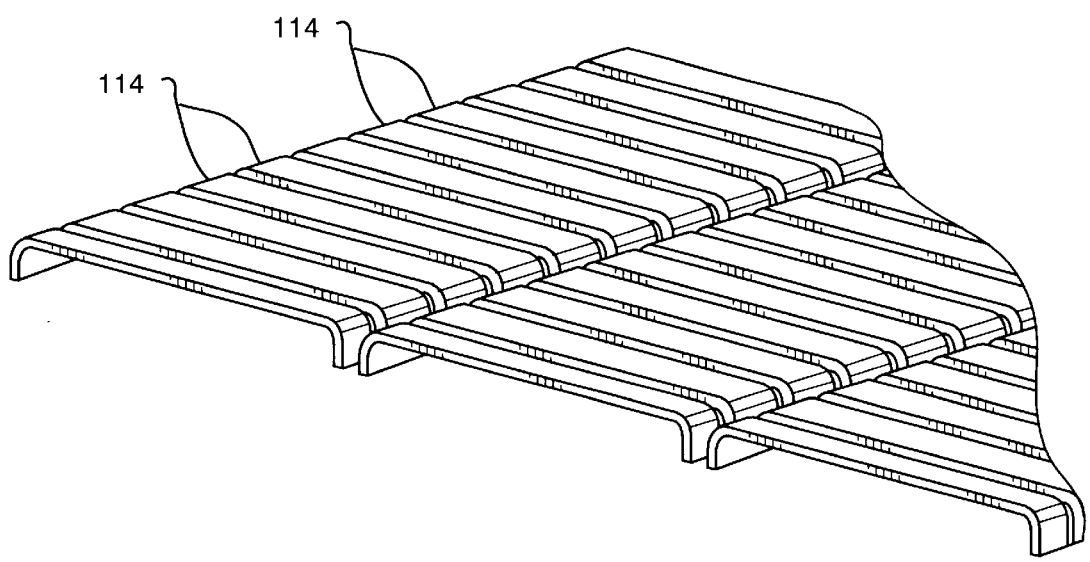
FIG. 12 is a partial perspective view of three of the FIG. 10 panels, configured as a bottom panel for the container of FIG. 3.

Referring FIGS. 9–12, stainless steel sheet is slotted, and folded at the edges to fabricate bottom panels 114. The panels are arrayed as shown in FIG. 12 to form the bottom of container 100. The bottom edges of corrugated airflow plates 116 are inserted into the slots from above, held at equidistant spacing in the container by the slots, and rest on the folded slot ends, as in FIG. 11. The channels of the slightly protruding airflow plates are thus open to airflow from beneath the container when the container is filled with bulk materials.

As will be appreciated by those skilled in the art, these and other airflow plate designs and open wall airway structures are adaptable to container 100 and to other containers and dryers of the invention.

Figure 13:
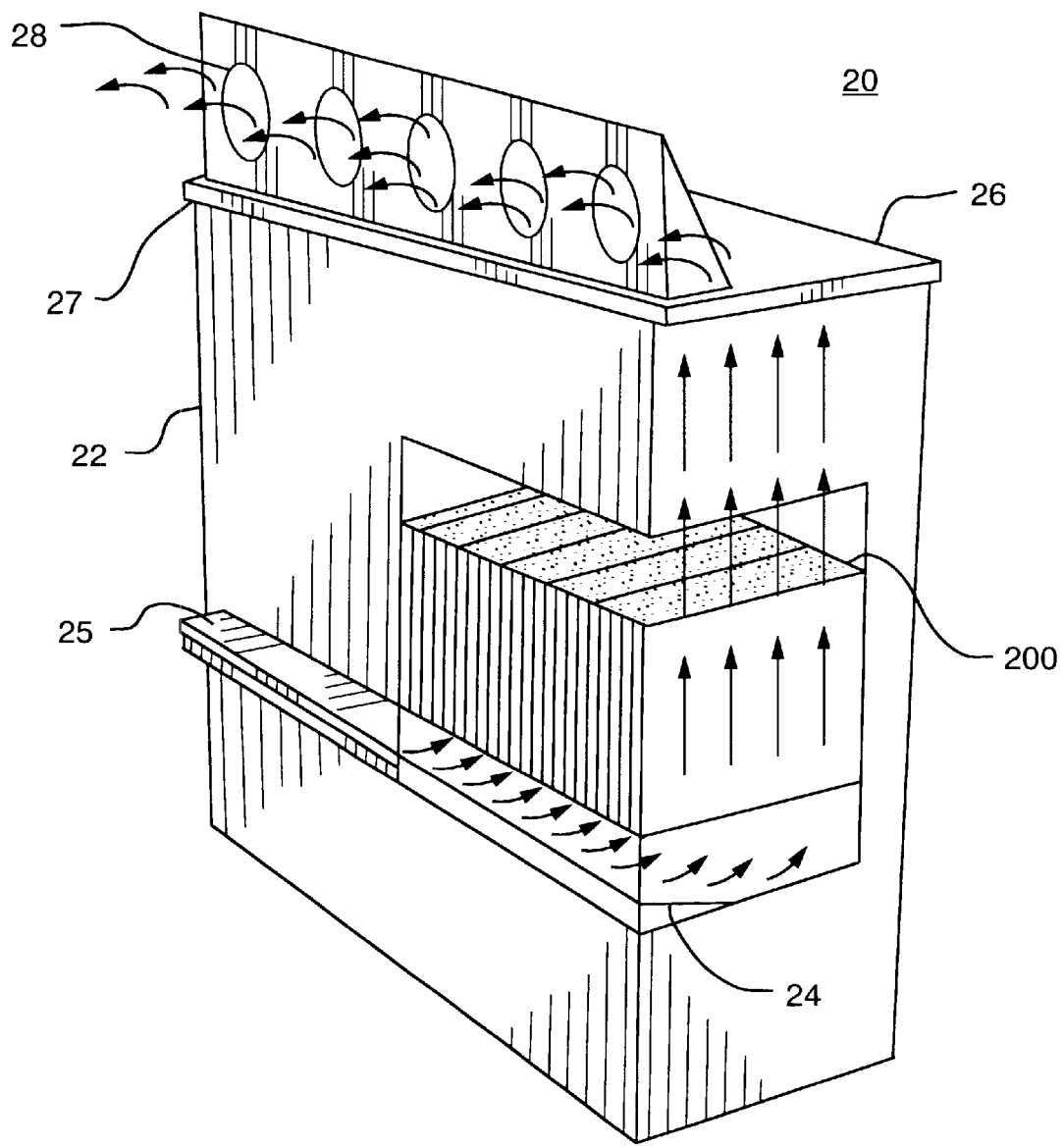
FIG. 13 is a left rear perspective view of a preferred embodiment dryer, with a partial cut away revealing the bulk material container and general airflow pattern.
Figure 14:
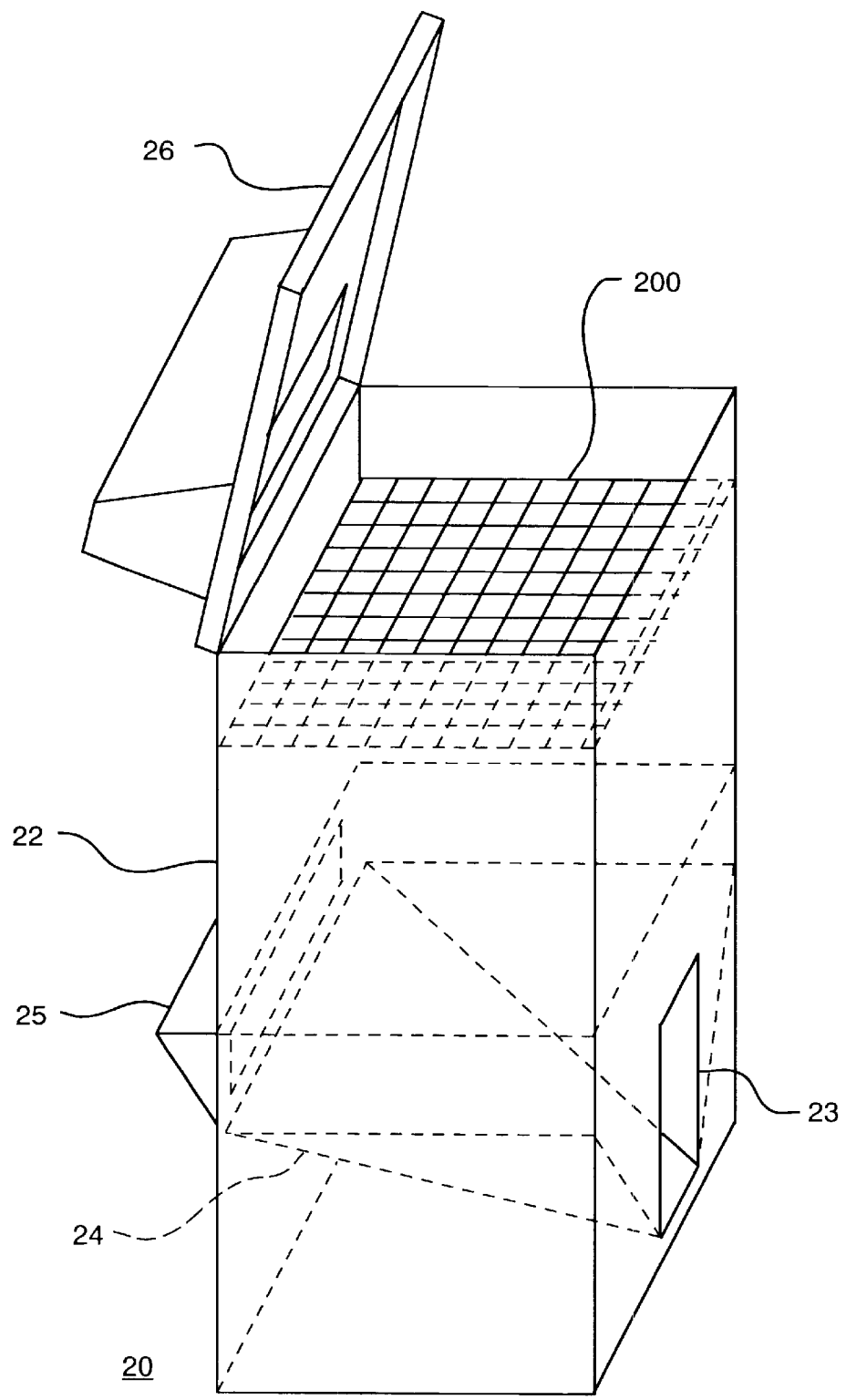
FIG. 14 is a left front perspective view of the embodiment of FIG. 1, the front and left side of the enclosure and the enclosed portion of the container shown in phantom.

Referring to FIGS. 13 and 14, an airflow dehydrator 20, consists of enclosure 22, configured with front side discharge door 23, a sloping discharge plate 24, and an airflow inlet 25 on the back side, which is a large, air manifold that can be connected to a solar, oil, gas or wood fired furnace, a solar hot air panel, or other source of warm air. Hinged top 26 is configured with exhaust ports 28, to which powered exhaust fans may be readily adapted if desired. Vertical airflow container 200 is supported within enclosure 22 so as to seal off air flow from inlet 24 to exhaust port 28, except as may pass through the airflow passageways of container 200, as further described below. Hinged top 26 may be opened for access to and filling of container 200. Bulk material, when dry and allowed to fall through the bottom of container 200, is directed by sloping discharge plate 25 towards discharge door 23 for collection.

Figure 15:
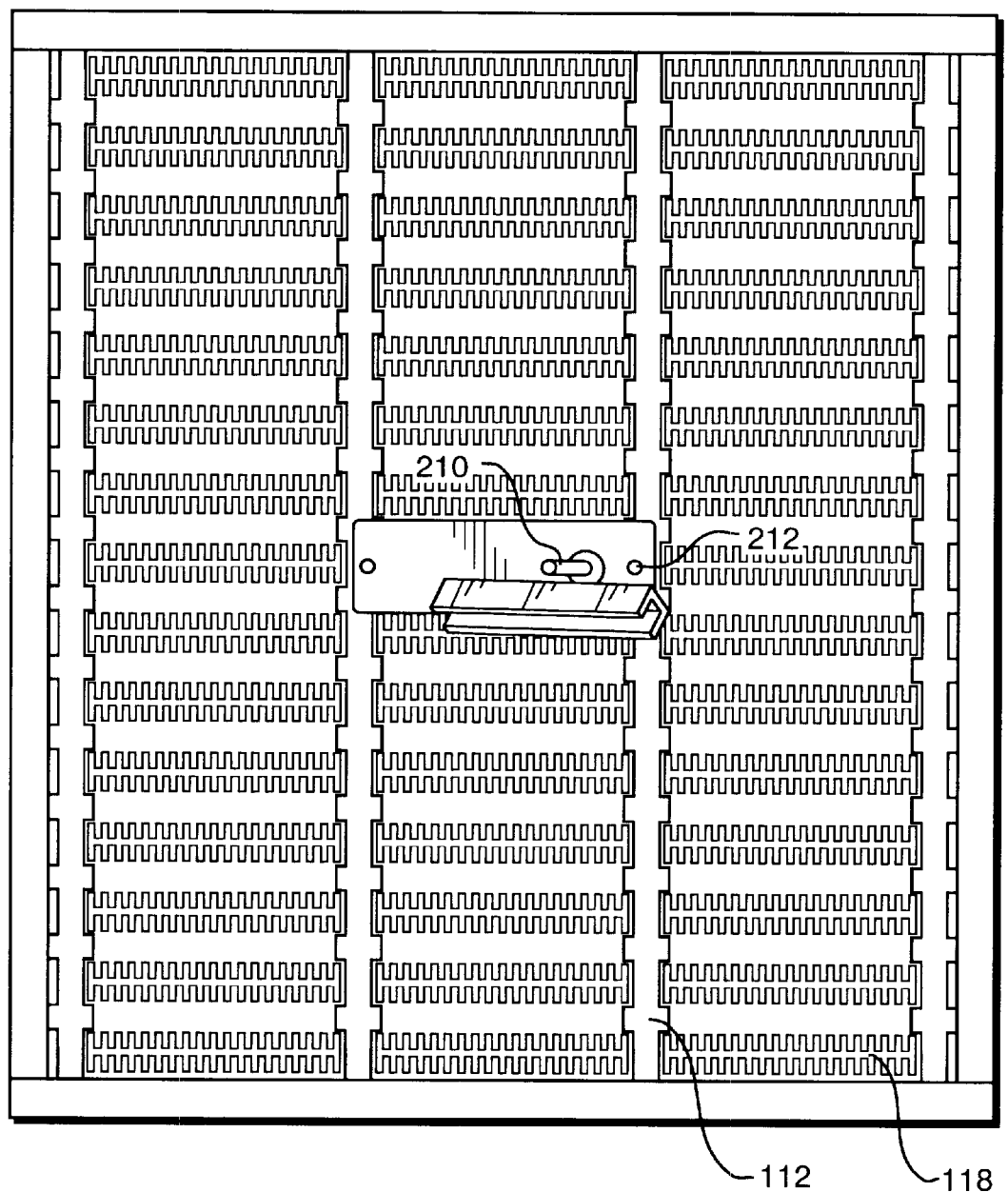
FIG. 15 is a perspective top view of a ribbed, vertical airflow plate container.
Figure 16:
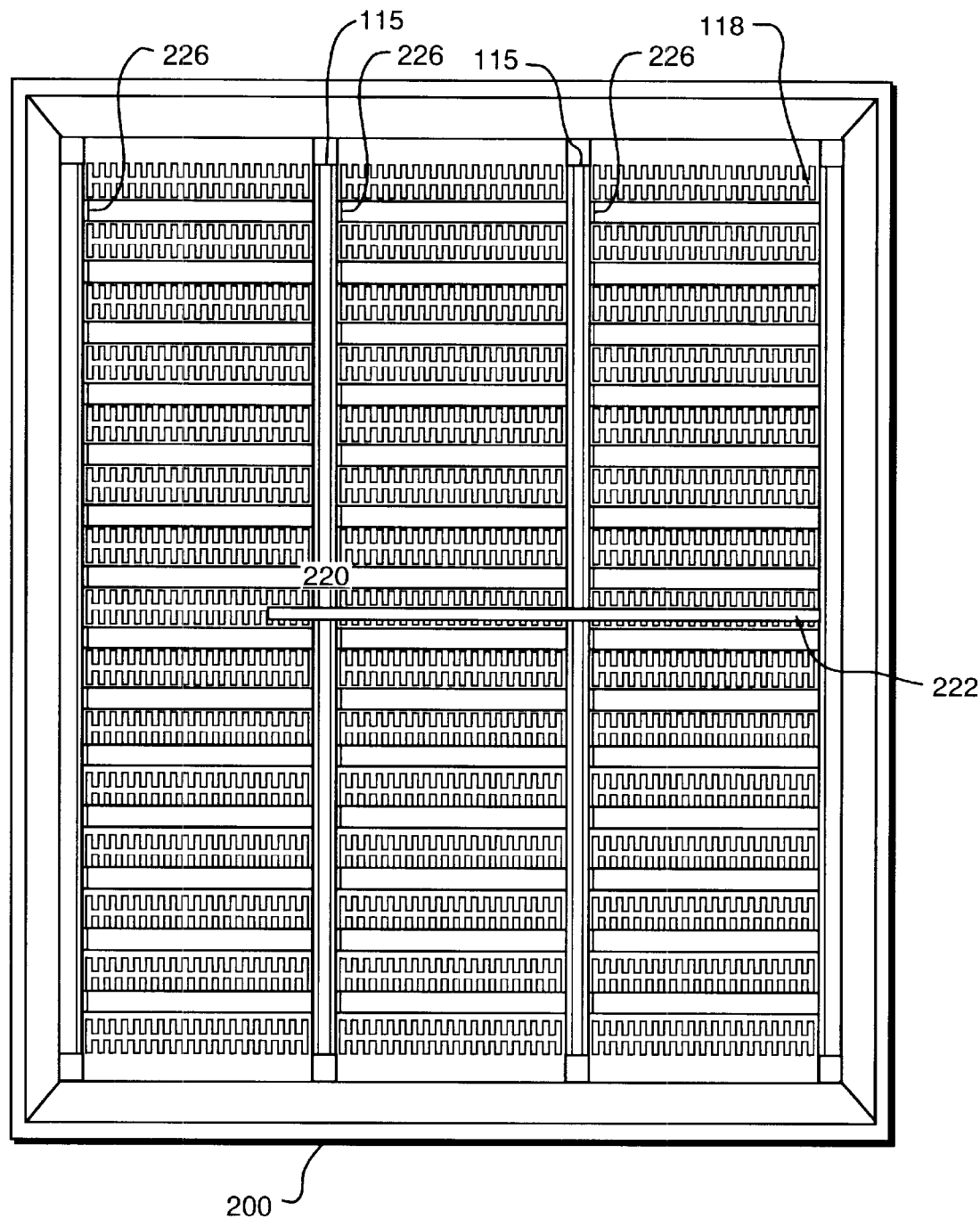
FIG. 16 is a perspective bottom view of the ribbed, vertical airflow plate container of FIG. 15, with the bottom gates shown closed.
Figure 17:
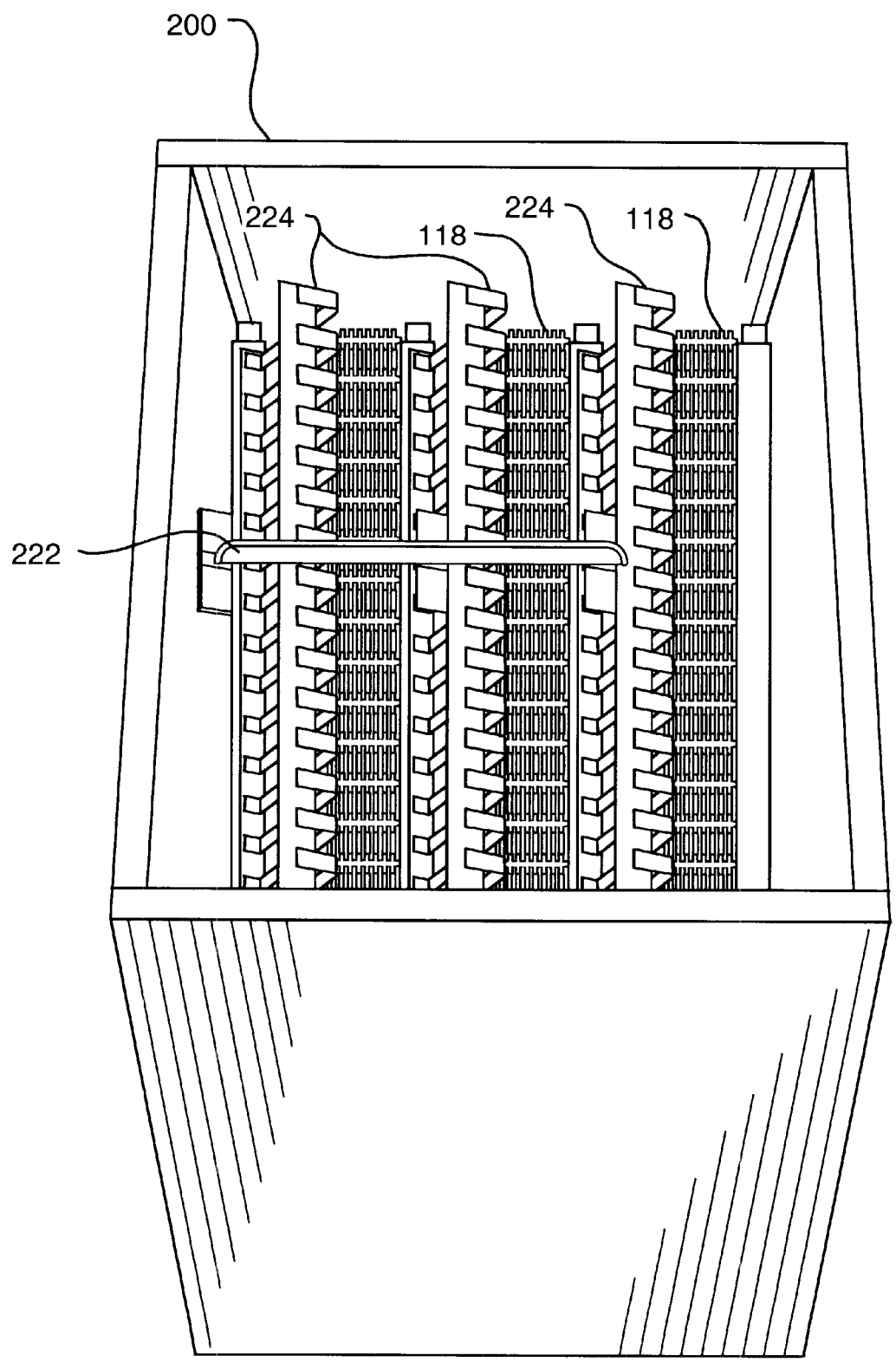
FIG. 17 is a perspective bottom view of the ribbed, vertical airflow plate container of FIG. 15, with the bottom gates shown open.

Containers for dryers such as dehydrator 20, such as container 200, are similar, in that in both cases the bottom panels are ventilated in some fashion to connect the vertical airflow plates to the airflow source or supply. However, container 200 is distinguished from container 100 by having an openable bottom panel system, so that bulk materials can be loaded through the top and emptied when dry, through the bottom. With this arrangement, the container can be left more or less stationary in the dryer. Alternatively, the elements of container 200 can simply be integrated directly into the dehydrator 20 design, if desired. Referring to FIGS. 15, 16 and 17, looking at the FIG. 15, open top of container 200, support brackets 112 and vertical airflow plates 118 are visible, as is dump gate handle 210 and handle bracket 212. Referring to FIG. 16, airflow plates 118, bottom support brackets 115, and closed dump gate assembly 220, are visible. Gate link rod 222 connects the three bays of compartment gates 224 together, and through the center of the container to dump gate handle 210. Releasing handle 210 from handle bracket 212, opens dump gate assembly 200, by rotating open each bay of gates 224 on its respective gate hinge 226, as shown in FIG. 17.

Figure 18:
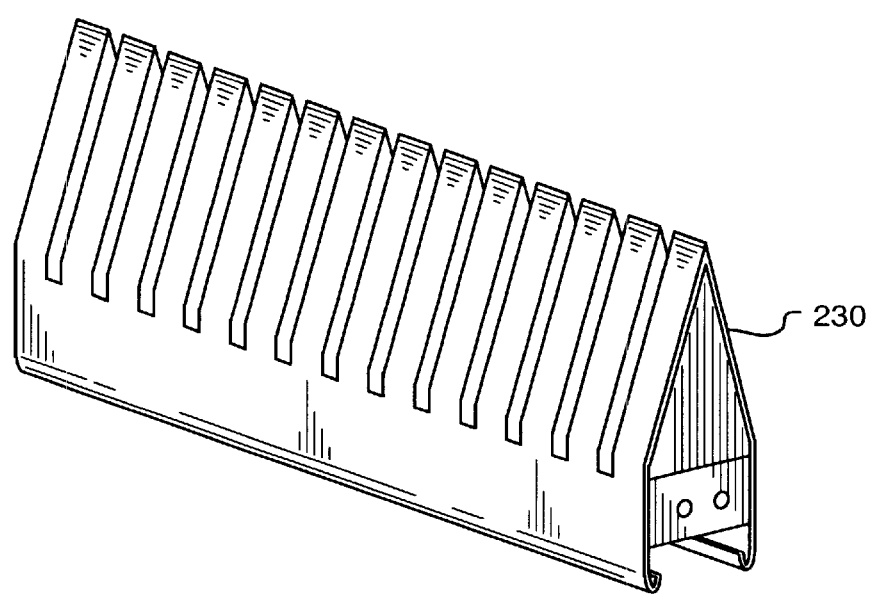
FIG. 18 is a perspective view of a slotted V brace for supporting airflow plates in a container.
Figure 19:
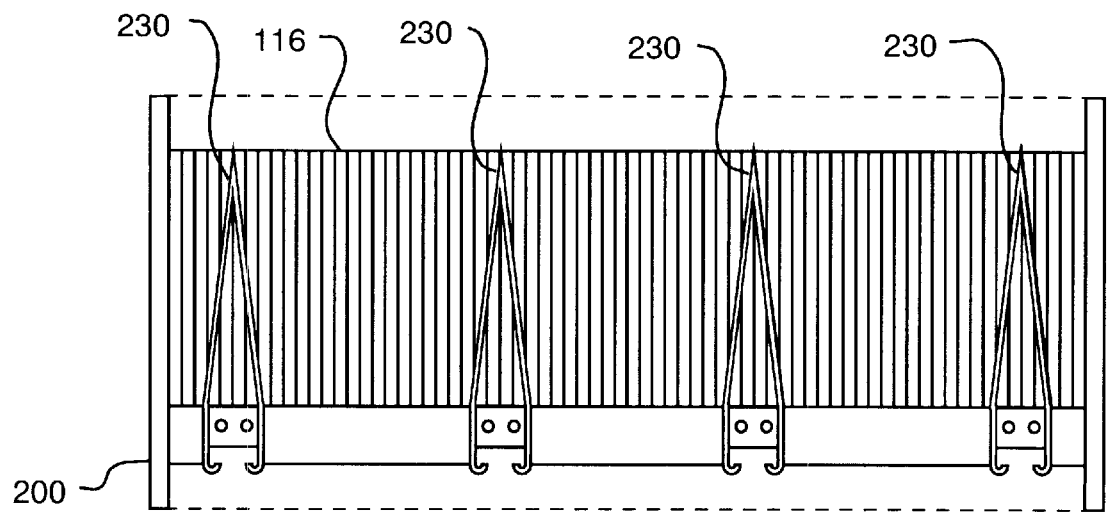
FIG. 19 is a cross section view of a vertical airflow plate container employing the slotted V brace of FIG. 18 in support of the airflow plates.

For vertical airflow containers using parallel airflow plates, it is desirable to reduce or eliminate top side support brackets so that the bulk materials can be loaded more easily to the top of the airflow plates. Referring to FIGS. 18 and 19, slotted and inverted V braces 230, uniformly spaced and attached to opposing sides of container 200, provides an open top spacing and lateral support system for a full compliment of corrugated airflow plates 116. The airflow plates are seated in the bottom of the inverted V slot. The V brace height coincides with the top of the airflow plates, permitting easy loading and leveling of the bulk materials in the container. On the bottom side of the container, the dump gates are oriented to close and open the space between the V braces. The open space within the inverted V brace 230 is lost as to container volume, but does assure even greater penetration of the bulk materials by the drying effect of the airflow entering from underneath, and exiting out the top of the container. V braces 230 are preferably fabricated of stainless steel.

Dryers 10 and 20 above are illustrative of small batch dryers, using relatively small containers. They can be scaled upwards within practical limits of materials. Very low pressure convective airflow pressure, such as generated by solar devices, will effectively penetrate up to a foot or so of coffee bean depth in a vertical airflow container. The benefits of these devices include low cost, simplicity, easy operation and adaptability. Greater capacity can be had by simply duplicating the apparatus as many times as desired.

However, commercial dryers may be scaled up to very significant size, with room size enclosures holding a layer of beans upwards of two feet deep on a screened surface over an airflow source plenum, with very large, powerful fans driving the airflow up through the beans. The airflow through the deep, room size layer of beans is inevitably uneven, causing inconsistent drying and less than optimal quality of the end product.

It is therefore squarely within the scope of the invention to incorporate the elements of container 200 into a room size dryer, providing therein the distributed airway system through which the airflow is evenly distributed through the bulk materials, with a level top height to the airflow plate network that permits hydraulic loading of the bulk crops by water pipe systems as are known and used in the industry, where the water carries the beans into the dryer, and is then leaked out the bottom of the dryer before the drying operation is commenced. The upflow of the relatively high pressure dry air through the underside grill work or screened support layer is evenly distributed through the layer of material by the airway structure of the invention. Dump gates incorporated into the grill work or support layer are operated collectively or in sections to dump the dried product into collection channels underneath.

Figure 20:
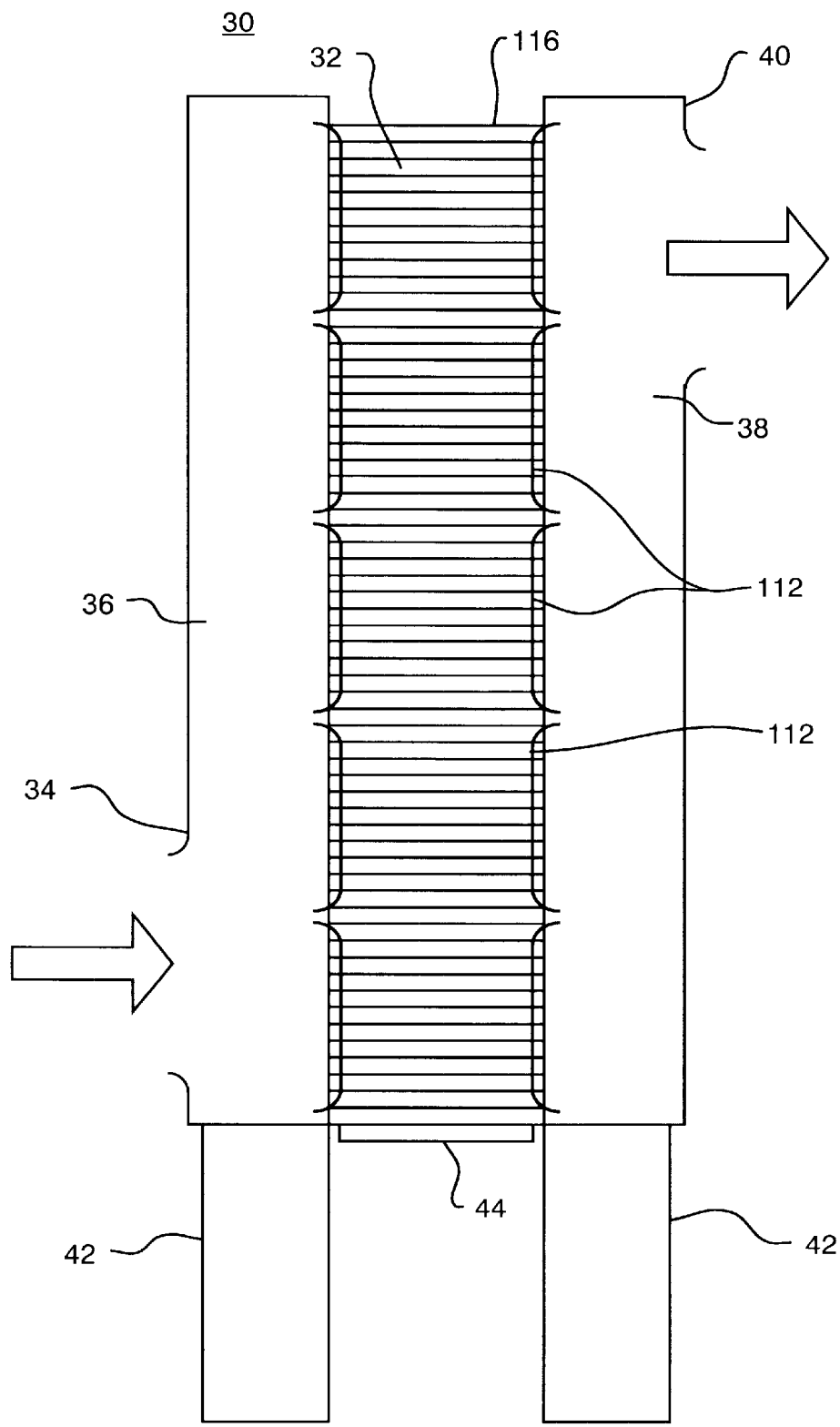
FIG. 20 is a cross section view of a horizontal airflow, corrugated airflow plate, commercial dryer module employing the slotted panel of FIGS. 9–12 for retaining the airflow plate.

An alternate, large scale apparatus design, within the scope of the invention, uses a horizontal airflow scheme. FIG. 20 is a cross section view of a preferred embodiment for coffee beans, a horizontal airflow commercial dryer module 30. Module 30 incorporates a container 32, employing the slotted panel 112 of FIGS. 9–12 for retaining corrugated airflow plates in a horizontal configuration at a bulk materials depth of about four feet, and a width for airflow of about eight inches. Container length, or module length, can be up to two feet without special consideration. Inlet 34 feeds plenum 36 and the inflow side of container 32. The horizontal airflow exits the outflow side of container 32 into plenum 38 and is exhausted out of outlet 40. Legs 42 support dryer module 30 sufficiently high to permit opening of dump gate 44 and discharge of the bulk materials into the user's collection system. The airflow supply for dryer module 30 is presumed to be fan powered on the inlet or outlet side, and auxiliary heat may be added to the airflow upstream of the container section.

Figure 21:
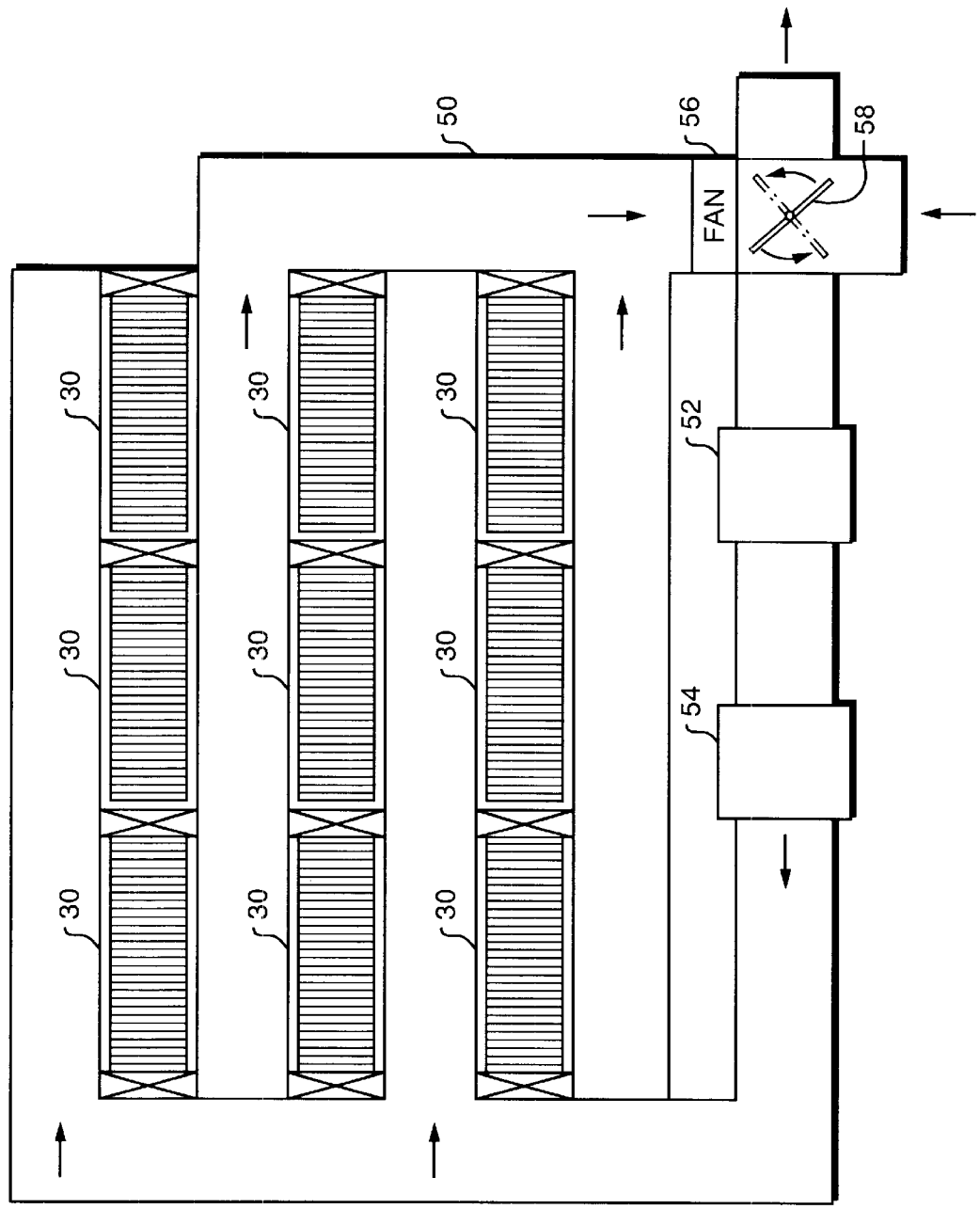
FIG. 21 is a plan view of a commercial dryer system employing the dryer module of FIG. 20.

Dryer module 30 may be configured and operated as a single unit, or ganged with ductwork as in the FIG. 21 plan view for larger operations. The FIG. 21 system includes three bays of three end to end modules 30, with ductwork 50 connecting the inlets and outlets. Dehumidifier 52 and hot air furnace 54 are connected in the upstram side of the airflow. Exhaust fan 56 is connected on the downstream side of the airflow. Airflow control valve 58 enables airflow to be re-circulated for heat conservation, where the dehumidifier is able to remove excess moisture.

In all cases where airflow is predominately controlled by fans and contained by ductwork, the distributed airway system permits the airflow direction to be reversed. This is readily apparent in horizontal flow dryers, but is also applicable to vertical airflow dryers of the invention, without a significant increase in back pressure, due to the presence of the airways. This airflow switching technique enhances the drying process by offering quick penetration of the drying effect of the airflow on the bulk materials from the top down as well as from the bottom up, or left and right in the case of horizontal airflow, thereby more quickly drying the entire volume of material.

While the heat generated in a simple solar collector is adequate for a basic dryer module of the invention, the minimal head pressure of a relatively short solar powered airflow generator combined with the resistance of the distributed array of airflow channels through the container results in a minimal volume of airflow through the bulk crops drying. Any boost to the airflow pressure is found to improve the performance of the dryer. A passive solar-generated air flow can be boosted by the addition of circulation fans at various places on the dryer, including in the convective generator section, in the upstream or source air plenum, or in the exhaust plenum. Of course, fans are often used exclusive of any passive solar contribution, in many commercial dryer installations.

Auxiliary heat, supplied by heaters, heat exchangers, or the injection of supplemental hot air, can also be added anywhere to the air flow path upstream of the container. Sensors may be added to the container or dryer to monitor humidity, time, and/or temperature; indicators may be provided locally or remotely. A local or remote, automated or programmable control means may be added for better control and/or recording of the process. Pressure sensors can be utilized to monitor the weight of the container or dryer to calculate the progress and amount of moisture reduction.

While these elements are not core components of the instant invention, use of the invention enhances the benefit provided by greater pressure and more heat, up to the point of maximum drying effect in a given configuration for a given bulk product. The division and distribution of the airflow through the bulk materials assures uniformity and rapidity of drying, thereby improving the quality of the end product and the efficiency of the system.

The design configuration of the container interior can be of scaled and varied as required for drying various crops or other materials, always incorporating appropriate vertical and/or horizontal airway partitioning elements finely distributed throughout the container. The drying effect begins at the core of each airway passage, and progresses fairly uniformly over time, laterally into the bulk material and downstream towards the airflow outlet side of the container. The volume and depth of the container module design and size of the airflow interface can be optimized for different bulk crops, available airflow and heat, and total desired drying capacity.

The bottom of the container can be configured with a releasable door or dump gate assembly that is ventilated as necessary to permit airflow to the airplates, while closing off the bottom opening of the bays or compartments which hold the bulk material being dried. The gates can be easily opened, manually or remotely if so configured, to dump or empty the container without the need to turn it over.

As will be realized, the invention is capable of other and different embodiments, and its several details are capable of modifications in various respects, all without departing from the invention. For example, there is within the scope of the invention a distributed airflow container for drying bulk crops in an airflow dryer system, consisting of a bottom and sidewall support surfaces configured for defining an interior volume for containing the bulk crop, with an open top through which the bulk product can be poured into the container, and where the bulk product can be poured out by inverting the container, and where the open top is where the airflow escapes the container.

The bottom of the container is configured with uniformly distributed airflow openings that communicate with the airflow of the dryer system. There are airflow plates arranged parallel to each other and uniformly spaced throughout the container, dividing the container into bays or compartments. The airflow plates have vertically oriented parallel and uniformly spaced open wall channels on each surface. The channels are smaller in width than an average size specimen of a bean or kernel, or other particle of the bulk crop or material being dried. The ends of the airflow plates are arranged so that the airflow channels communicate readily with the airflow openings.

When the airflow plates are corrugated panels, the corrugations are the channels for both sides of the plate. When the airflow plates are ribbed plates, the plates may be extrusions, but they look like a flat sheet with parallel, uniformly spaced ribs standing out on each side or surface. The channels are the spaces between adjacent ribs. When the airflow plates are cross ribbed plates, they look like two sets of parallel and uniformly spaced apart ribs, where the two sets are oriented at right angles to each other and are contacting each other in a grid-like manner forming open squares where one side has open channels running at right angles to the channels on the other side, and the channels are open to each other between rib intersections, permitting a large degree of cross flow from one side to the other.

As another example, there is a container where one surface has airway openings communicating the channels of the airplates to the incoming relatively dry airflow, and a support surface opposite the first surface which is likewise configured with uniformly distributed airflow openings, also likewise communicating with the airplate channels, for passing the moisture ladened airflow out of the container. A dump gate assembly integrated into the bottom of the container provides for removing the bulk products out the bottom of the container when dry. The dump gate assembly has a gate for each bay, which can be operated between closed and open positions so that the bulk crops are retained or released from their respective bays as needed. The gates may be gained for common control of the whole container or operated individually or in sections.

As yet another example, there is a dryer module for drying bulk crops in an airflow dryer system, which can be ganged together end to end and/or in banks, as a large dryer system, or set up and used as a stand-alone dryer. A functional, modular-based dryer of the invention requires only an airflow, and a container of the invention, where the container has a bottom and sidewall support surfaces, where the surfaces define an interior volume for holding the batch of bulk crop. One or more of the surfaces is configured with uniformly distributed airflow openings exposed to the airflow. There are a multiplicity of airflow plates arranged in parallel and uniformly spaced throughout the holding volume of the container. The airflow plates have parallel and uniformly spaced open wall channels on both surfaces, with the channels being smaller in width than an average size specimen of the bulk crop. There are airflow openings located on two opposing sidewall surfaces of the container, the airflow being directed in through the first side and out through the second side.

The descriptions and figures of the preferred embodiments are illustrative of the invention, but other embodiments within the scope of the invention and the claims below, as will be readily apparent to those skilled in the art.

I claim:

1. A distributed airflow container for drying bulk crops in an airflow dryer system, comprising:
   bottom and sidewall support surfaces configured for defining an interior volume for containing said bulk crop,
   means for filling said container with said bulk crops,
   means for admitting air into said container,
   airflow plates for uniformly distributing a convective airflow throughout said container when filled with said bulk crops,
   means for releasing said airflow from said container, and
   means for emptying said container of said bulk crops.

2. A distributed airflow container according to claim 1, said means for filling comprising an open top through which said bulk product can be poured, said means for emptying comprising said open top through which said bulk product can be poured out by inverting said container, and said means for releasing said airflow comprising said open top communicating with said airflow plates.

3. A distributed airflow container according to claim 2, said means for admitting air comprising said bottom configured with uniformly distributed airflow openings.

4. A distributed airflow container according to claim 3, said airflow plates arranged in parallel and uniformly spaced throughout said container, said airflow plates having parallel and uniformly spaced open wall channels on each surface, said channels being smaller in width than an average size specimen of a selected said bulk crop, said channels communicating with said airflow openings.

5. A distributed airflow container according to claim 4, said airflow plates comprising corrugated panels, the corrugations of which comprise said channels on each said surface.

6. A distributed airflow container according to claim 4, said airflow plates comprising panels configured with uniformly spaced ribs on each said surface, said channels comprising the spaces between adjacent said ribs.

7. A distributed airflow container according to claim 1, said means for filling said container comprising an open top through which said bulk crops can be poured.

8. A distributed airflow container according to claim 7, said means for admitting an airflow comprising one or more of said bottom and sidewall support surfaces further configured with uniformly distributed airflow openings.

9. A distributed airflow container according to claim 8, said airflow plates arranged in parallel and uniformly spaced throughout said container, said airflow plates having parallel and uniformly spaced open wall channels on each surface, said channels being smaller in width than an average size specimen of a selected said bulk crop, said channels communicating with said airflow openings.

10. A distributed airflow container according to claim 9, said airflow plates comprising corrugated panels, the corrugations of which comprise said channels on each said surface.

11. A distributed airflow container according to claim 9, said airflow plates comprising panels configured with uniformly spaced ribs on each said surface, said channels comprising the spaces between adjacent said ribs.

12. A distributed airflow container according to claim 9, said airflow plates each comprising two sets of parallel and uniformly spaced open ribs, said sets oriented at right angles and contacting each other in a grid-like manner, said channels comprising the spaces between adjacent said ribs.

13. A distributed airflow container according to claim 9, said means for releasing said airflow from said container comprising an open top on said container, said channels communicating therewith.

14. A distributed airflow container according to claim 9, said means for releasing said airflow from said container comprising a said support surface opposite said means for admitting said air, said support surface opposite configured with uniformly distributed airflow openings communicating with said channels.

15. A distributed airflow container according to claim 9, said means for emptying said container of said bulk crops comprising a dump gate assembly integrated into said bottom, and means for opening said dump gate assembly.

16. A distributed airflow container for drying bulk crops in an airflow dryer system, comprising: bottom and sidewall support surfaces defining an interior volume, an open top through which said bulk crops can be poured into said volume, airflow plates oriented in parallel and uniformly spaced apart throughout said volume, said airflow plates having parallel and uniformly spaced open wall channels on each surface, said channels being smaller in width than an average size specimen of a selected said bulk crop, said bottom configured with uniformly distributed airflow openings, said channels communicating with said airflow openings.

17. A distributed airflow container according to claim 16, the spaces between adjacent airflow plates comprising bays, said bottom further comprising a dump gate assembly with a gate for each said bay, said container further comprising means for operating said gates between a closed position wherein said bulk crops are retained in said bay and an open position where said bulk crops are released to fall out of said bay.

18. A dryer module for drying bulk crops in an airflow dryer system, comprising:

- a container with bottom and sidewall support surfaces, said surfaces defining an interior volume for holding said bulk crop, one or more of said surfaces configured with uniformly distributed airflow openings, said airflow openings exposed to an airflow,
- a multiplicity of airflow plates arranged in parallel and uniformly spaced throughout said volume, said airflow plates having parallel and uniformly spaced open wall channels on each surface, said channels being smaller in width than an average size specimen of a selected said bulk crop, said channels communicating with said airflow openings, and
- a dump gate assembly integrated into said bottom of said container, said assembly being closable to contain said bulk crops therein and openable to release said bulk crops therefrom.

19. A dryer module for drying bulk crops according to claim 18, said channels oriented horizontally, said airflow openings located on two opposing sidewall surfaces, said airflow being directed in through said airflow openings on a first of said sidewall surfaces and out through said openings on the second of said sidewall surfaces.

20. A dryer module according to claim 19, said airflow plates comprising corrugated panels.

\* \* \* \* \*